US008866772B2

(12) United States Patent
Konami

(10) Patent No.: US 8,866,772 B2
(45) Date of Patent: Oct. 21, 2014

(54) INFORMATION PROCESSING TERMINAL AND METHOD, PROGRAM, AND RECORDING MEDIUM

(75) Inventor: Shuichi Konami, Chiba (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 13/485,507

(22) Filed: May 31, 2012

(65) Prior Publication Data

US 2012/0313869 A1 Dec. 13, 2012

(30) Foreign Application Priority Data

Jun. 7, 2011 (JP) ................................ 2011-127334

(51) Int. Cl.
*G06F 3/048* (2013.01)
*G06F 3/0488* (2013.01)

(52) U.S. Cl.
CPC .................................. *G06F 3/04883* (2013.01)
USPC .......................................... 345/173; 715/863

(58) Field of Classification Search
CPC .............. G06F 3/017; G06F 3/0487–3/04886; G06F 2203/04808
USPC .................................... 345/173–178; 715/863
See application file for complete search history.

(56) References Cited

U.S. PATENT DOCUMENTS

| 2006/0253793 | A1* | 11/2006 | Zhai et al. ...................... 715/773 |
| 2011/0093820 | A1* | 4/2011 | Zhang et al. ................... 715/863 |
| 2011/0273380 | A1* | 11/2011 | Martin ........................... 345/173 |
| 2011/0296353 | A1* | 12/2011 | Ahmed et al. ................ 715/848 |

FOREIGN PATENT DOCUMENTS

JP 2005-339420 12/2005

* cited by examiner

*Primary Examiner* — Nathan Danielsen
(74) *Attorney, Agent, or Firm* — Sherr & Jiang, PLLC

(57) ABSTRACT

There is provided an information processing terminal including: an input unit for receiving an input of a gesture; a recognition unit for recognizing the gesture input to the input unit; and a display unit for displaying gestures enterable on a screen to which the gesture has been input as correction candidates if the input gesture is unrecognizable.

9 Claims, 14 Drawing Sheets

INFORMATION PROCESSING TERMINAL AND METHOD, PROGRAM, AND RECORDING MEDIUM

BACKGROUND

The present disclosure relates to an information processing terminal and method, a program, and a recording medium, and more particularly to an information processing terminal and method, a program, and a recording medium, which can enable a gesture to be reliably input.

The number of interfaces operable by gestures is increasing along with the widespread use of information processing terminals such as a smart phone and a tablet terminal on which a touch panel is mounted. When a user has input a gesture, the information processing terminal recognizes the gesture and executes a process associated with the recognized gesture.

Because there are various types of gesture inputs, an information processing terminal displays a menu that provides a guide of enterable gestures to a user (for example, see Japanese Patent Application Laid-Open No. 2005-339420).

SUMMARY

In an information processing terminal in which a plurality of applications can operate, a recognizable gesture or a process associated with the gesture may differ according to an application. Thus, the user may input a gesture not corresponding to an application. In this case, of course, a process intended by the user is not executed.

In view of the foregoing, it is desirable to reliably input a gesture.

According to an embodiment of the present technology, there is provided an information processing terminal including: an input unit for receiving an input of a gesture; a recognition unit for recognizing the gesture input to the input unit; and a display unit for displaying gestures enterable on a screen to which the gesture has been input as correction candidates if the input gesture is unrecognizable.

The information processing terminal may further include: a trajectory display control unit for displaying a trajectory of the input gesture and displaying the trajectory as an icon.

The correction candidates may be displayed in order of decreasing resemblance of the gestures to the unrecognizable gesture.

The information processing terminal may further include: a storage unit for storing correction information in which the trajectory is associated with the correction candidate selected by a user if the input gesture is unrecognizable.

An information processing method of an information processing terminal, a program, and a program recording medium according to other embodiments of the present technology each correspond to the information processing terminal according to the above-described embodiment of the present technology.

In the other embodiments of the present technology, an input of a gesture is input, the input gesture is recognized, and enterable gestures are displayed as correction candidates on a screen to which the gesture has been input if the gesture is unrecognizable.

According to the embodiments of the present technology described above, it is possible to reliably input a gesture.

DETAILED DESCRIPTION OF THE EMBODIMENT(S)

Figure 1:
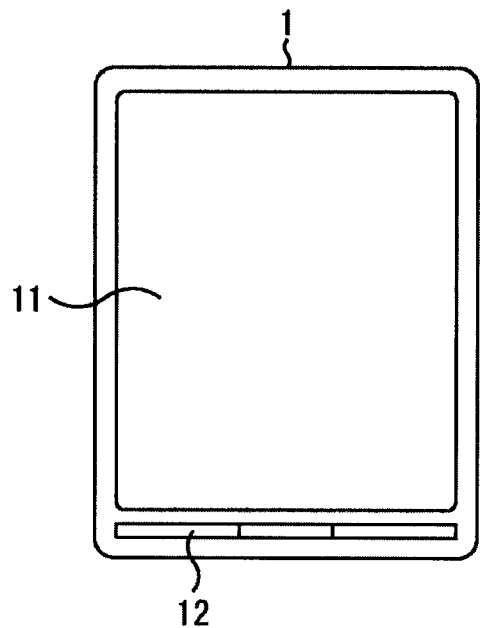
FIG. 1 is a diagram illustrating an example of the external appearance of an information processing terminal according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
1. First Embodiment (Gesture Input Correction Function)
2. Second Embodiment (Enterable Area Display Function)
<First Embodiment>

A gesture input correction function, which is a function of correcting a gesture by displaying options when the gesture input by a user is unrecognizable, will be described.

[External Appearance of Information Processing Terminal]

FIG. 1 is a diagram illustrating an example of the external appearance of the information processing terminal according to an embodiment of the present technology.

The information processing terminal 1 of FIG. 1 is a portable terminal such as a smart phone, a portable phone, a personal digital assistant (PDA), or a portable navigation device (PND). The information processing terminal 1 is provided with a housing having a size allowing the user to carry the information processing terminal 1 in one hand.

A display unit 11 formed of a liquid crystal display (LCD) and the like is provided on the front side of the housing of the information processing terminal 1. A touch panel 25 is provided on the top surface of the display unit 11, and the user can directly operate the touch panel 25 of a position corresponding to information displayed on the display unit 11 with a finger or the like. An operation unit 12 formed of a plurality of buttons is provided below the display unit 11.

[Configuration Example of Information Processing Terminal]

Figure 2:
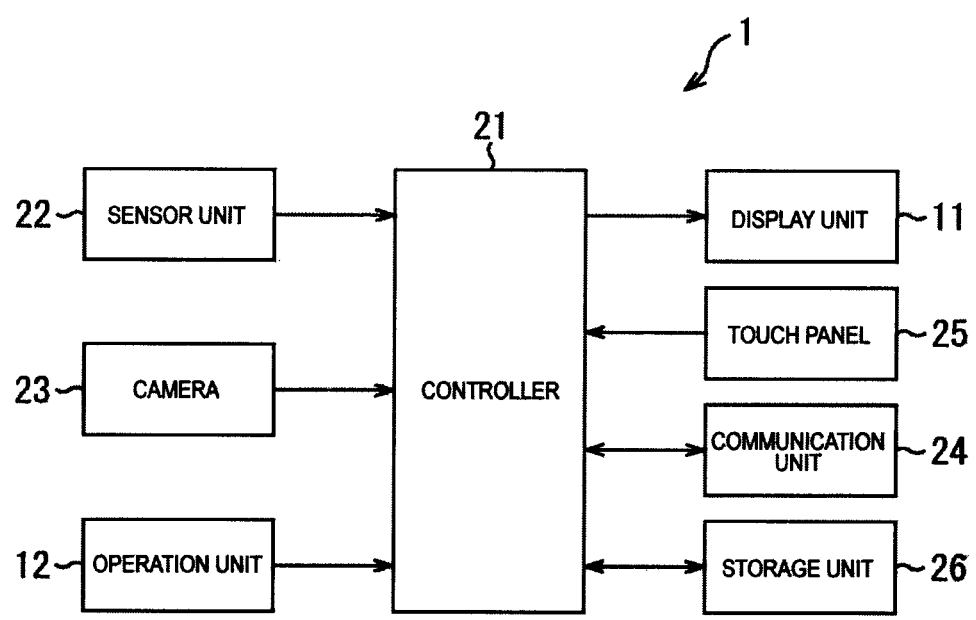
FIG. 2 is a block diagram illustrating an electrical configuration example of the information processing terminal.

FIG. 2 is a block diagram illustrating an electrical configuration example of the information processing terminal 1.

The information processing terminal 1 is configured by connecting a sensor unit 22, a camera 23, a communication unit 24, the touch panel 25, and a storage unit 26 as well as the display unit 11 and the operation unit 12 to a controller 21.

The controller 21 is constituted by a central processing unit (CPU), a read only memory (ROM), and a random access memory (RAM) (not illustrated) and the like. The CPU of the controller 21 is executed using the RAM by loading a program from the ROM, and controls the whole operation of the information processing terminal 1.

The sensor unit 22 is formed of a gyro sensor and the like, and detects the vibration occurring in the information processing terminal 1. The sensor unit 22 outputs information regarding the detected vibration to the controller 21.

The camera 23 has an imaging element such as a complementary metal oxide semiconductor (CMOS) image sensor, and performs photoelectric conversion of light captured by a lens (not illustrated) provided on the front side of the housing of the information processing terminal 1, and generates image data. An image captured by the camera 23 is provided to the controller 21.

The communication unit 24 communicates with a device on a network such as a local area network (LAN) or the Internet. For example, information of a web page and the like received by the communication unit 24 is displayed on the display unit 11.

The transparent touch panel 25 is provided on the top surface of the display unit 11, and detects an operation of the user's finger or the like. The storage unit 26 is constituted by a nonvolatile memory, a hard disk, and the like, and stores programs to be executed by the controller 21, data, and the like.

Figure 3:
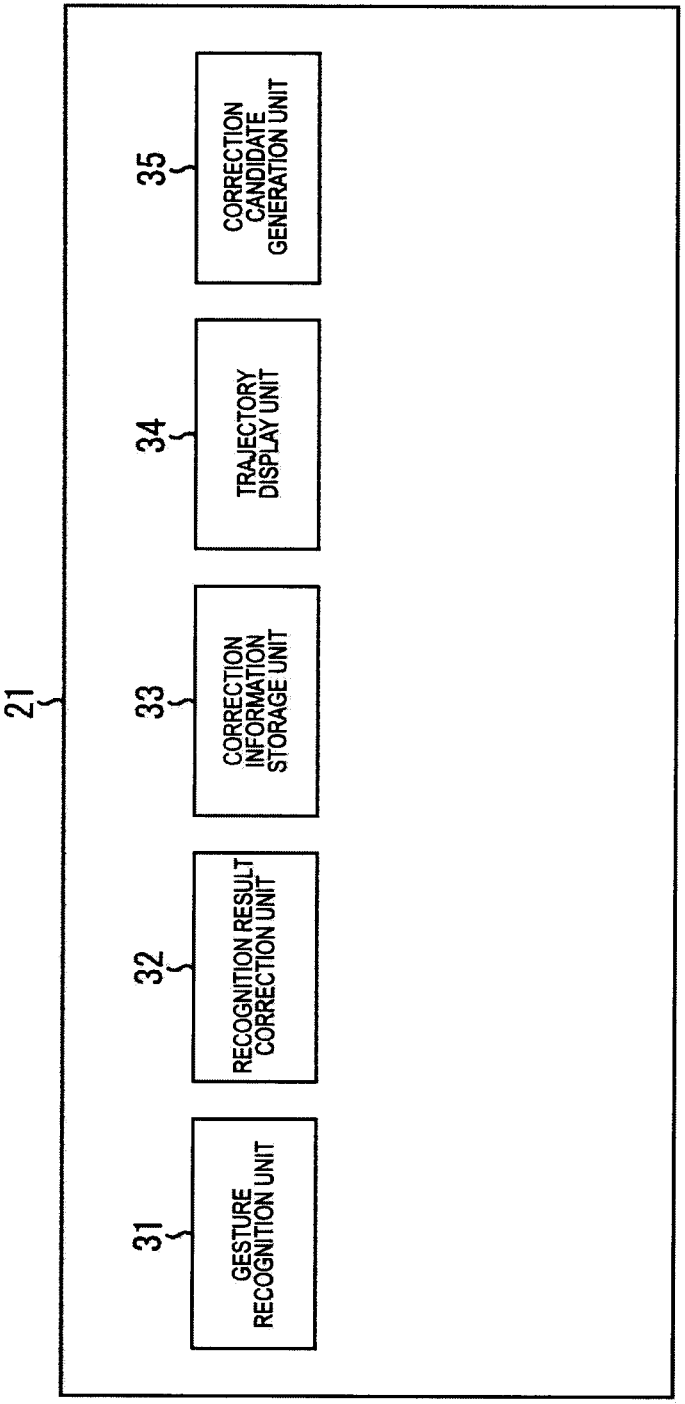
FIG. 3 is a block diagram illustrating a functional configuration example of a controller.

FIG. 3 is a block diagram illustrating a functional configuration example of the controller 21. At least some of the functional units illustrated in FIG. 3 are implemented by causing the controller 21 of FIG. 2 to execute a predetermined program.

In FIG. 3, the controller 21 is configured to include a gesture recognition unit 31, a recognition result correction unit 32, a correction information storage unit 33, a trajectory display unit 34, and a correction candidate generation unit 35.

The gesture recognition unit 31 detects a gesture input by the user tracing over the touch panel 25 with a finger. In addition to the above-described tracing operation, there are a plurality of operations as gestures. For example, the gesture is a tap operation in which the user lightly touches the touch panel 25 once and a double-touch operation in which the user lightly touches the touch panel 25 twice. For example, there is a flick operation in which the user flicks the touch panel 25 with a finger 41 in an arbitrary direction (see FIG. 4 as will be described later). The gesture further includes an operation in which the finger 41 of the user draws a graphic such as a circle or a triangle on the touch panel 25.

In addition, the gesture recognition unit 31 recognizes which of processes to be executed by the information processing terminal 1 is associated with the detected gesture. That is, if there is no process associated with the detected gesture, the gesture recognition unit 31 determines that the gesture is unrecognizable.

Further, the gesture recognition unit 31 executes a process associated with the recognized gesture.

The recognition result correction unit 32 performs a process of prompting the user to perform correction for the gesture unrecognizable by the gesture recognition unit 31. Specifically, for example, gestures recognizable on a screen to which the user has input the gesture or other gestures close to the gesture input by the user are displayed as options on the display unit 11. In addition, for example, the recognition result correction unit 32 displays an area where the gesture is enterable if an area where the user has input the gesture in correspondence with an image of the display unit 11 is an area where the gesture is unrecognizable.

If the user has input the unrecognizable gesture, the correction information storage unit 33 associates the unrecognizable gesture with a gesture selected by the user, and stores an association result as correction information. The correction information storage unit 33 iteratively stores the correction information every time the unrecognizable gesture is detected. On the basis of the correction information accumulated in the correction information storage unit 33, the gesture recognition unit 31 learns the user's gesture. In addition, the correction information storage unit 33 associates an identification (ID) specifying an application currently displayed on the display unit 11 and an ID specifying a screen with a gesture, and stores an association result.

The trajectory display unit 34 displays a trajectory of the gesture recognized by the gesture recognition unit 31 on the display unit 11. In addition, the trajectory display unit 34 creates an animation in which a gesture trajectory is reduced to a predetermined size, and displays a gesture based on the predetermined size as the reduced trajectory on the display unit 11. The reduced trajectory will be described later with reference to FIG. 7.

The correction candidate generation unit 35 generates gestures recognizable on the screen to which the user has input the gesture or gesture candidates close to the unrecognizable gesture as options by referring to the ID specifying the application currently displayed on the display unit 11 and the ID specifying the screen stored in the correction information storage unit 33. In addition, the correction candidate generation unit 35 detects an area where the gesture is enterable from among images displayed on the display unit 11 by referring to the ID specifying the application currently displayed on the display unit 11 and the ID specifying the screen stored in the correction information storage unit 33.

Figure 4:
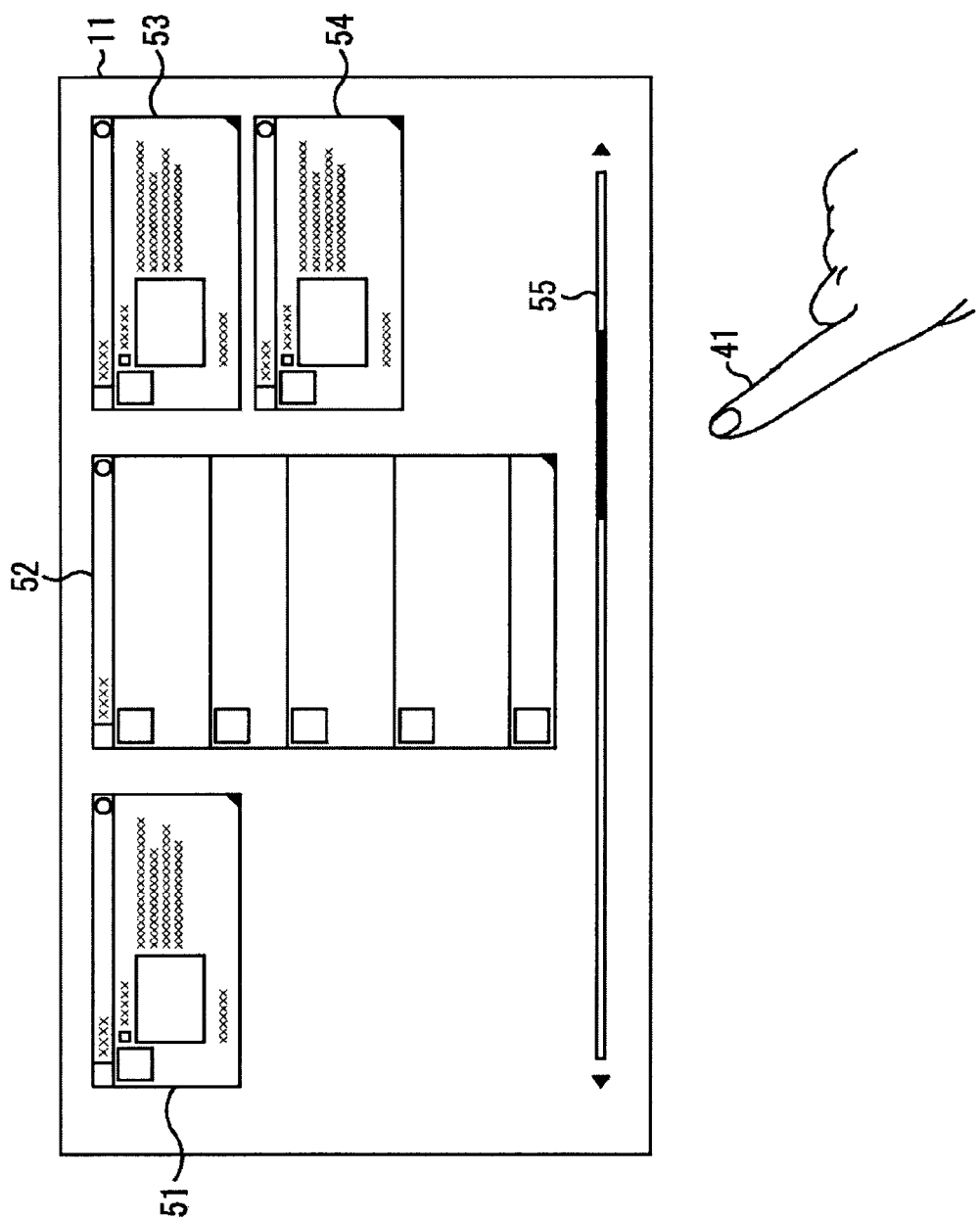
FIG. 4 is a diagram illustrating a display example of a display unit.

FIG. 4 is a diagram illustrating a display example of the display unit 11. As described above, the transparent touch panel 25 is provided on the top surface of the display unit 11, and the user has visual contact with information displayed on the display unit 11 via the touch panel 25 and performs a direct operation with the finger 41 or the like.

The finger 41 of the user inputs the gesture to the touch panel 25. The user inputs the gesture by causing the finger 41 to be in contact with the touch panel 25 and performing various operations on the touch panel 25. Hereinafter, for simplicity of description, the gesture is also described as being input to the display unit 11, if necessary.

Display areas 51 to 54 are windows displayed on the display unit 11. Images corresponding to content and applications are displayed on the display areas 51 to 54.

A scroll bar 55 can cause an image displayed on the display unit 11 to move right or left. That is, the user can cause the image displayed on the display unit 11 to move to left/right by flicking the scroll bar 55 in a horizontal direction.

Figure 5:
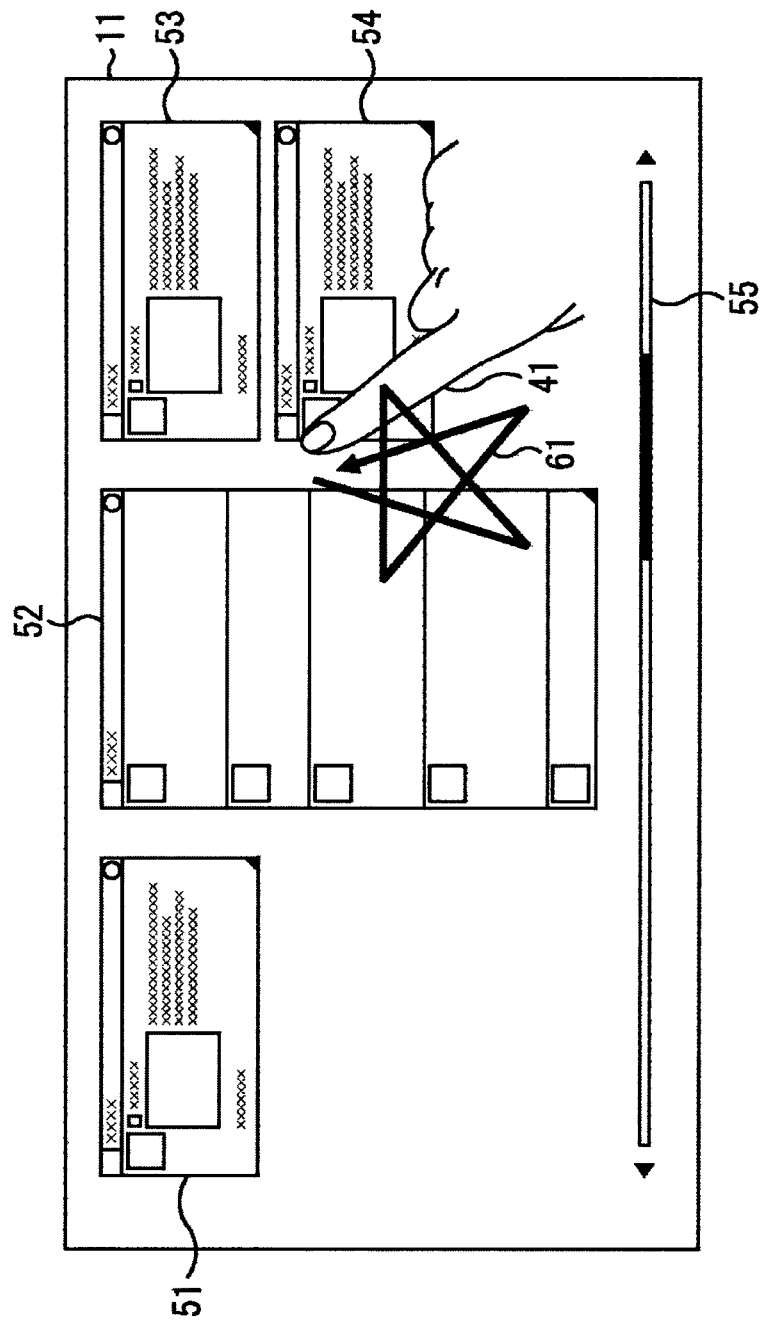
FIG. 5 is a diagram illustrating an example of a gesture input.

FIG. 5 is a diagram illustrating an example of a gesture input. If the user inputs a gesture of drawing a star with the finger 41 (hereinafter referred to as a gesture (star)), the gesture recognition unit 31 recognizes that the gesture by the finger 41 is the gesture (star). In addition, a trajectory of the finger 41 recognized by the gesture recognition unit 31 is displayed in a position where the gesture has been input by the finger 41 on the display unit 11 as a gesture trajectory 61 according to the trajectory display unit 34. The gesture recognition unit 31 executes a process (for example, "Open the option menu" or the like) associated with the input gesture (star).

[Operation of Information Processing Terminal]

Figure 6:
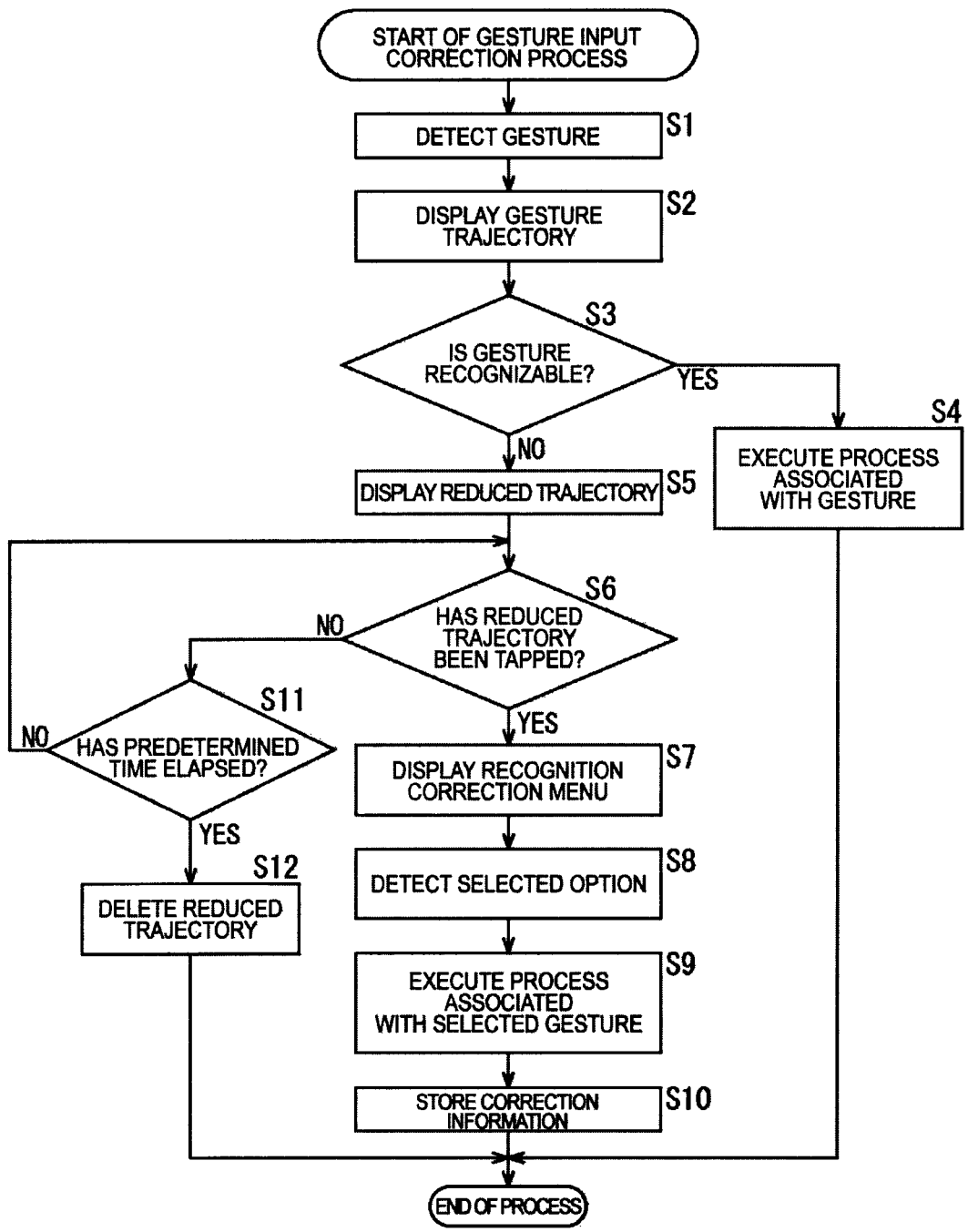
FIG. 6 is a flowchart illustrating a gesture input process.

FIG. 6 is a flowchart illustrating a gesture input process. When the user has input the gesture to the display unit 11, the gesture input process is executed by the controller 21.

In addition, FIGS. 7 to 10 are diagrams illustrating display examples when the gesture input process is executed. Hereinafter, a process of the flowchart of FIG. 6 will be described with reference to FIGS. 7 to 10.

In step S1, the gesture recognition unit 31 detects a gesture. Specifically, in FIG. 7, the gesture recognition unit 31 detects the gesture input with the finger 41 from the display unit 11. That is, a trajectory of the gesture is detected.

Figure 7:
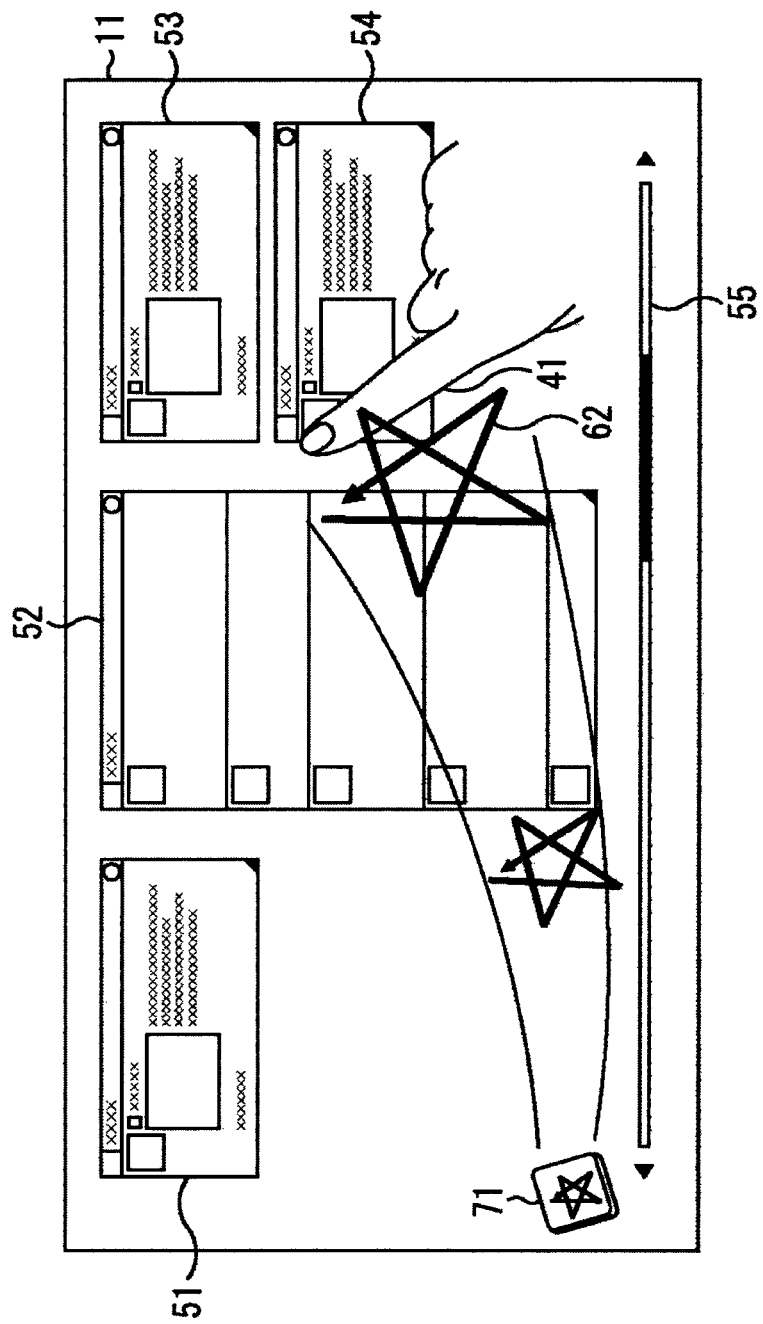
FIG. 7 is a diagram illustrating a display example when the gesture input process is executed.

In step S2, the trajectory display unit 34 displays the gesture trajectory detected by the gesture recognition unit 31 in step S1 on the display unit 11. For example, as illustrated in FIG. 7, the trajectory display unit 34 displays a star-shaped gesture trajectory 62 on the display unit 11.

In step S3, the gesture recognition unit 31 determines whether or not the detected trajectory is a recognizable gesture. If the detected gesture is not the recognizable gesture, NO is determined in step S3 and the process proceeds to step S5. For example, in FIG. 7, the gesture trajectory 62 looks like the gesture (star). However, as compared to the gesture trajectory 61 illustrated in FIG. 5, the gesture trajectory 62 is tilted in a left direction. Thus, the gesture recognition unit 31 is unable to recognize that the gesture trajectory 62 is the gesture (star).

Figure 8:
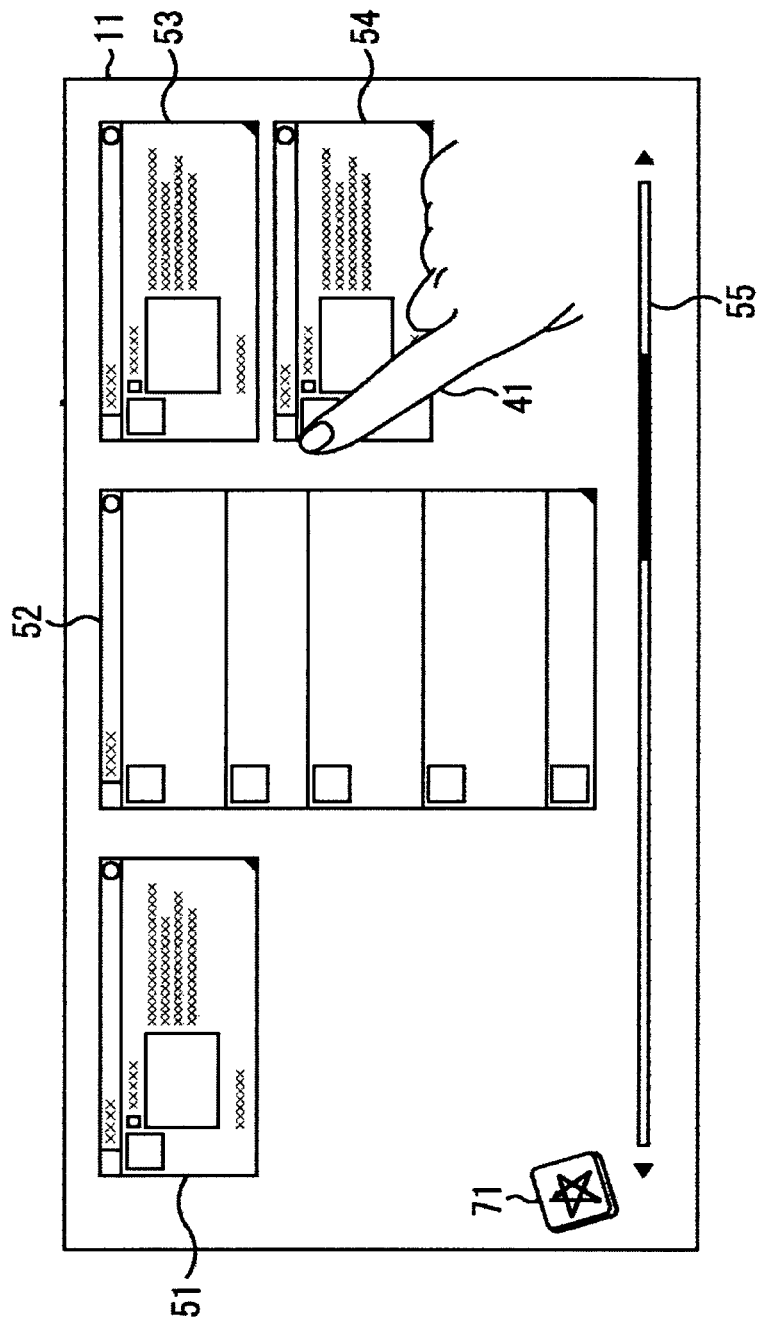
FIG. 8 is a diagram illustrating a display example when the gesture input process is executed.

In this case, in step S5, the trajectory display unit 34 displays a reduced trajectory 71. That is, as illustrated in FIG. 7, the trajectory display unit 34 displays an animation in which the gesture trajectory 62 is gradually reduced and moved in a left-right direction. As illustrated in FIG. 8, the trajectory display unit 34 displays the reduced trajectory 71 at the lower left as an icon.

The reduced trajectory 71 is displayed as described above. Thus, the user can know that a gesture performed by the user has not been recognized (or has been rejected) by the gesture recognition unit 31.

Figure 9:
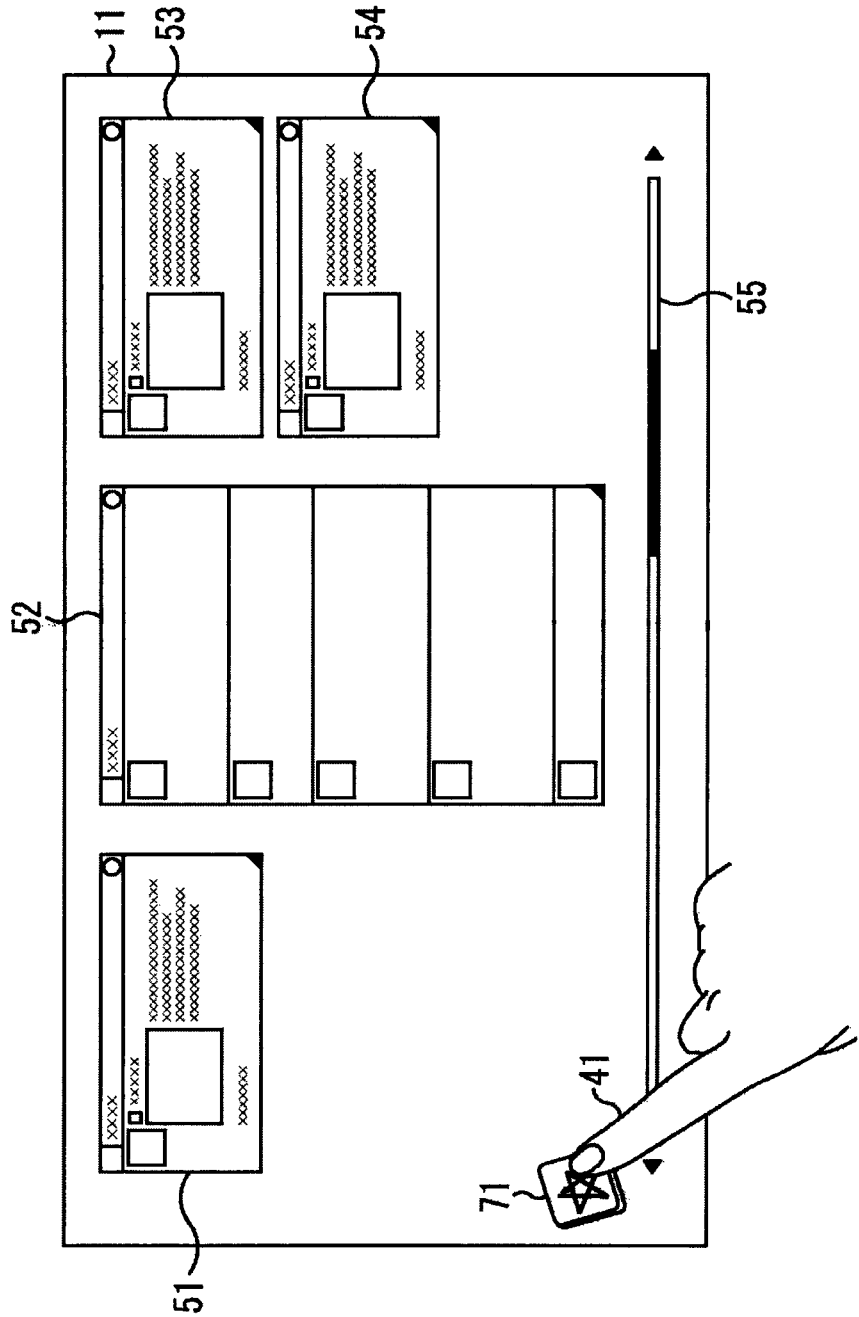
FIG. 9 is a diagram illustrating a display example when the gesture input process is executed.

Next, in step S6, the recognition result correction unit 32 determines whether the reduced trajectory 71 has been tapped. That is, if the user makes an input support request knowing that the input gesture has not been recognized from the displayed reduced trajectory 71, the user taps the reduced trajectory 71. As illustrated in FIG. 9, it is determined whether the user has tapped the reduced trajectory 71 with the finger 41.

If the reduced trajectory 71 has been tapped with the finger 41, YES is determined in step S6 and the process proceeds to step S7. In step S7, the recognition result correction unit 32 displays a recognition correction menu 81. That is, the recognition result correction unit 32 displays the recognition correction menu 81 generated by the correction candidate generation unit 35 on the display unit 11. The recognition correction menu 81 is a menu in which gestures recognizable on the screen (in the current case, the screen of FIG. 9) to which the current user has input the gesture are presented to the user as options in the order in which they seem close to the gesture input by the user. When the gesture recognition unit 31 has not recognized the gesture, the correction candidate generation unit 35 selects gestures close to the input trajectory from among enterable gestures, and generates the recognition correction menu 81.

Figure 10:
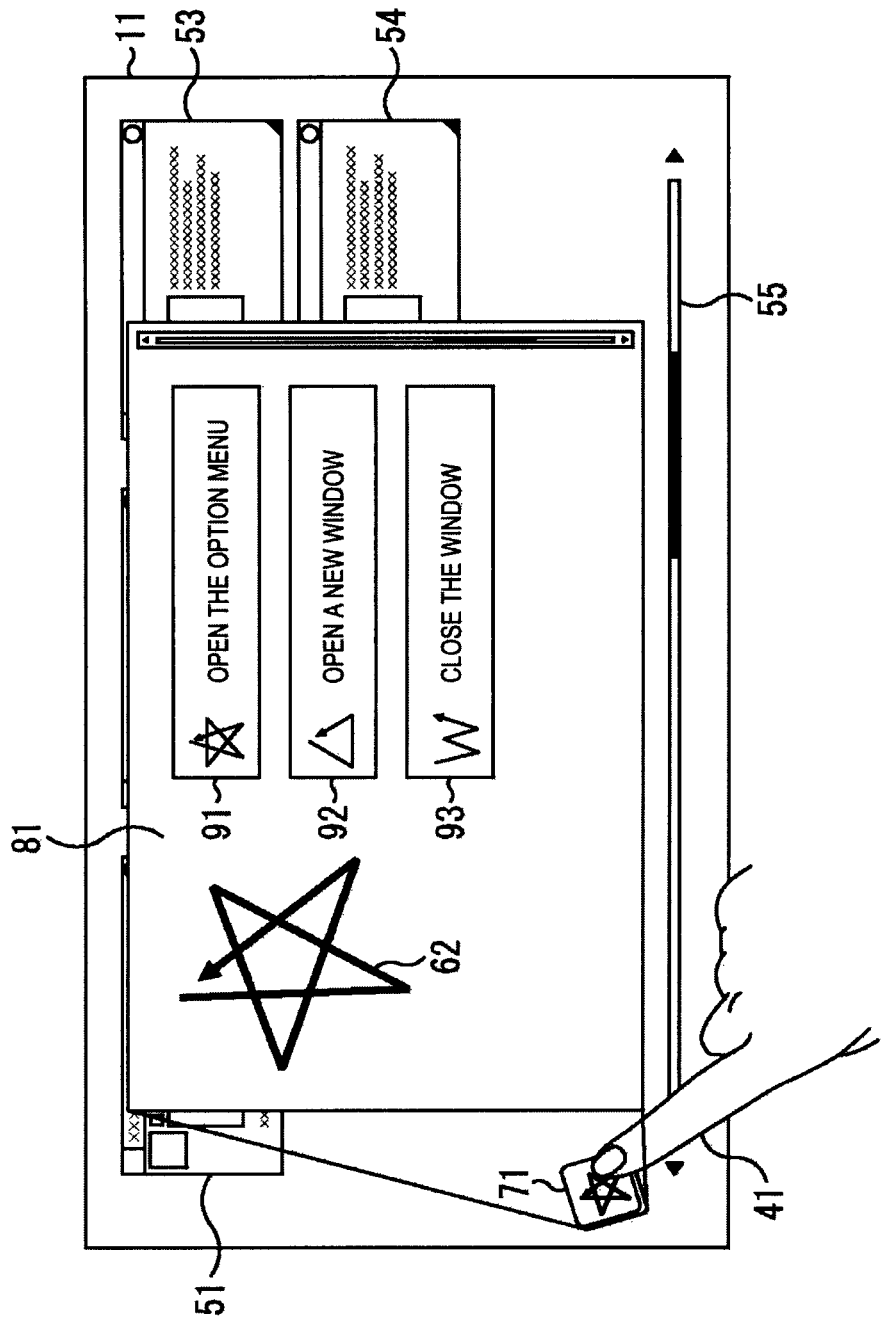
FIG. 10 is a diagram illustrating a display example when the gesture input process is executed.

Specifically, as illustrated in FIG. 10, the recognition correction menu 81 is displayed on the display unit 11 if the trajectory 71 is tapped with the finger 41. In the recognition correction menu 81, the gesture trajectory 62 input by the user and icons of options 91 to 93 as gesture candidates recognizable on the screen are displayed. For example, the gesture (star) and the text "Open the option menu" as the explanation of a process associated with the gesture (star) are displayed in the option 91. In addition, a gesture of drawing a triangle by the finger 41 (hereinafter referred to as a gesture (triangle)) and the text "Open a new window" as the explanation of a process associated with the gesture (triangle) are displayed in the option 92. Further, a gesture of drawing the letter W with the finger 41 (hereinafter referred to as a gesture (W)) and the text "Close the window" as the explanation of a process associated with the gesture (W) are displayed in the option 93.

The options 91 to 93 are displayed, so that the user can check a gesture the user wanted to input. The user selects an option, that is, an option corresponding to a gesture the user actually wanted to input.

In step S8, the recognition result correction unit 32 detects the selected option. That is, the option tapped with the finger 41 is detected from among the options 91 to 93 illustrated in FIG. 10.

In step S9, the gesture recognition unit 31 executes a process associated with the gesture selected in step S8. That is, for example, when the option 91 of the options 91 to 93 illustrated in FIG. 10 has been tapped with the finger 41, the gesture recognition unit 31 executes the process corresponding to "Open the option menu."

In step S10, the recognition result correction unit 32 stores correction information. That is, the correction information storage unit 33 associates the gesture (star) of the selected option 91 with the gesture trajectory 62, which is a trajectory of the detected gesture, and stores an association result as the correction information. Thereby, the gesture input process ends. The correction information is iteratively stored in the correction information storage unit 33 every time an unrecognizable gesture is detected. The gesture recognition unit 31 learns the user's gesture by referring to accumulated correction information. Thereafter, the gesture is recognized as the gesture (star), for example, if the gesture (star) tilted in the left direction has been detected.

On the other hand, if NO is determined in step S6, that is, if the reduced trajectory 71 is not tapped, the process proceeds to step S11.

In step S11, the recognition result correction unit 32 determines whether a predetermined time has elapsed. If the predetermined time has not elapsed, NO is determined in step S11 and the process returns to step S6. That is, the process of steps S6 and S11 is iterated until the predetermined time elapses or the reduced trajectory is tapped.

On the other hand, if the predetermined time is determined to have elapsed in step S11, the process proceeds to step S12.

In step S12, the recognition result correction unit 32 deletes the reduced trajectory 71. That is, if the reduced trajectory 71 has not been tapped even when the predetermined time has elapsed, the recognition result correction unit 32 deletes the reduced trajectory 71 by determining the reduced trajectory 71 as unnecessary information for the user.

A process when NO is determined in step S3 has been described above. On the other hand, if YES is determined in step S3, that is, if the detected gesture is the recognizable gesture, the process proceeds to step S4. In step S4, the gesture recognition unit 31 executes a process associated with the gesture. That is, if YES is determined in step S3, the process of steps S5 to S12 is not executed because it is unnecessary to correct the gesture.

Thereby, the gesture input process is executed, so that the user can know that the gesture performed by the user has been rejected. In addition, gesture candidates are displayed as options. Thus, the user can correct the gesture performed by the user and execute the same process as when an intended gesture has been correctly input.

In addition, the trajectory display unit 34 displays the trajectory of the input gesture. Thus, the user can guess the cause of gesture rejection, for example, such as that the gesture is not recognized because the display unit 11 is contaminated. Specifically, for example, when a line traced with the finger 41 is broken in the middle of the gesture trajectory, the user can guess that a broken portion of the gesture trajectory is not recognizable because the display unit 11 is contaminated. Thereby, the user cleans the display 11 so that a correct gesture input is recognizable.

If the gesture recognition unit 31 does not recognize the gesture, the controller 21 may output a sound or cause the information processing terminal 1 to vibrate simultaneously when the trajectory display unit 34 displays the reduced trajectory 71.

Although the reduced trajectory 71 is deleted if the reduced trajectory 71 is not tapped for a predetermined time, the following configuration can be made. That is, a new reduced trajectory 71 may be additionally displayed every time a different type of gesture is rejected. If the number of displays of reduced trajectories 71 exceeds an upper limit (for example, three or the like), the reduced trajectories 71 may be deleted in order from an old input.

Further, the reduced trajectory 71 is not limited to the display example of FIG. 7. For example, the trajectory display unit 34 may form an animation as if the reduced trajectory 71 moves and floats. It is preferable to give an impression obviously different from an original display. Thereby, the recognition result correction unit 32 can more effectively prompt the user to correct an input gesture.

In addition, even when a gesture input by an application is different, the user can easily correct the input gesture because the gesture and a process associated with the gesture are displayed on the recognition correction menu 81.

Further, an option such as "new setting" may be provided on the recognition correction menu 81. By selecting the option "new setting," the user can set a new menu corresponding to the input gesture (for example, the gesture trajectory 62). That is, the user can register a new gesture not registered as a gesture input in the gesture recognition unit 31.

<Second Embodiment>

Although the user's gesture input is supported by presenting options in the first embodiment, it is possible to support the user's gesture input by presenting enterable areas. For example, an enterable area display function, which is a function of displaying an area where a gesture is enterable, when the user inputs a gesture to an area where the gesture is not enterable or an area not corresponding to the gesture input by the user in the display unit 11 will be described.

The configuration of the information processing terminal 1 is the same as described with reference to FIGS. 1 to 3.

[Operation of Information Processing Terminal]

Figure 11:
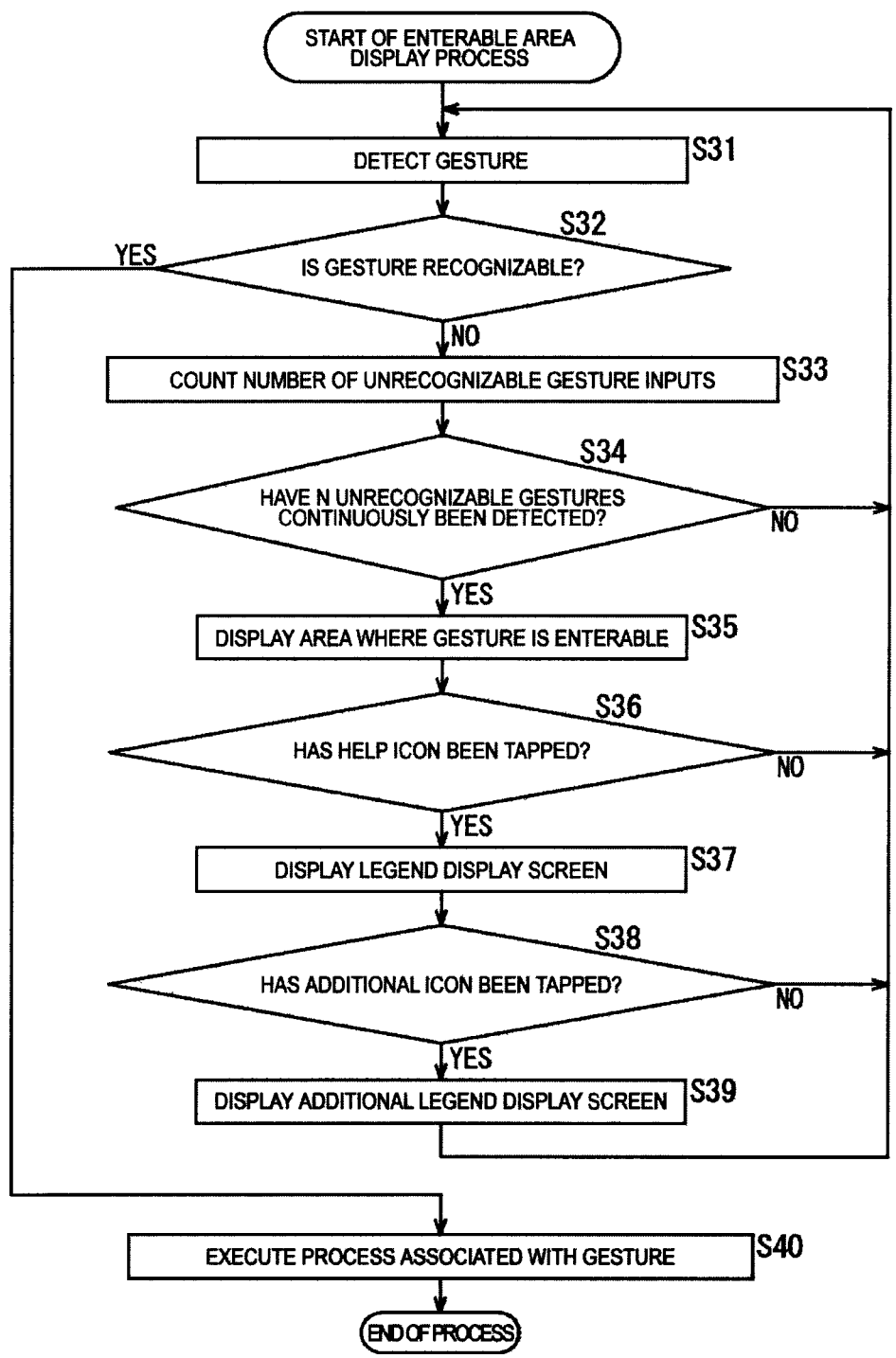
FIG. 11 is a flowchart illustrating an enterable area display process.

FIG. 11 is a flowchart illustrating an enterable area display process. The enterable area display process is executed by the controller 21 to implement the above-described enterable area display function.

In addition, FIGS. 12 to 15 are diagrams illustrating display examples when the enterable area display process is executed. Hereinafter, the process of the flowchart of FIG. 11 will be described with reference to FIGS. 4 and 12 to 15.

In step S31, the gesture recognition unit 31 detects a gesture. Specifically, in FIG. 4, the gesture recognition unit 31 detects the gesture input with the finger 41 from the display unit 11.

In step S32, the gesture recognition unit 31 determines whether the gesture is recognizable. If the detected gesture is not recognizable, NO is determined in step S32 and the process proceeds to step S33. Specifically, for example, if a tap input has been performed with the finger 41 in an area where there is no process associated with the tap input, NO is determined in step S32.

In step S33, the recognition result correction unit 32 counts the number of unrecognizable gesture inputs. For example, the number of tap inputs performed with the finger 41 is counted in the above-described area where there is no process associated with the tap input.

In step S34, the recognition result correction unit 32 determines whether N unrecognizable gestures have been continuously counted. N is an arbitrary integer. If NO is determined in step S34, that is, if an unrecognizable gesture or N continuous unrecognizable gestures is/are not detected, the process returns to step S31. In other words, until the N unrecognizable gestures are continuously detected, the process of steps S31 to S34 is iterated as long as no recognizable gesture is detected (the process of step S32). If the N unrecognizable gestures have continuously been detected, YES is determined in step S34 and the process proceeds to step S35.

Figure 12:
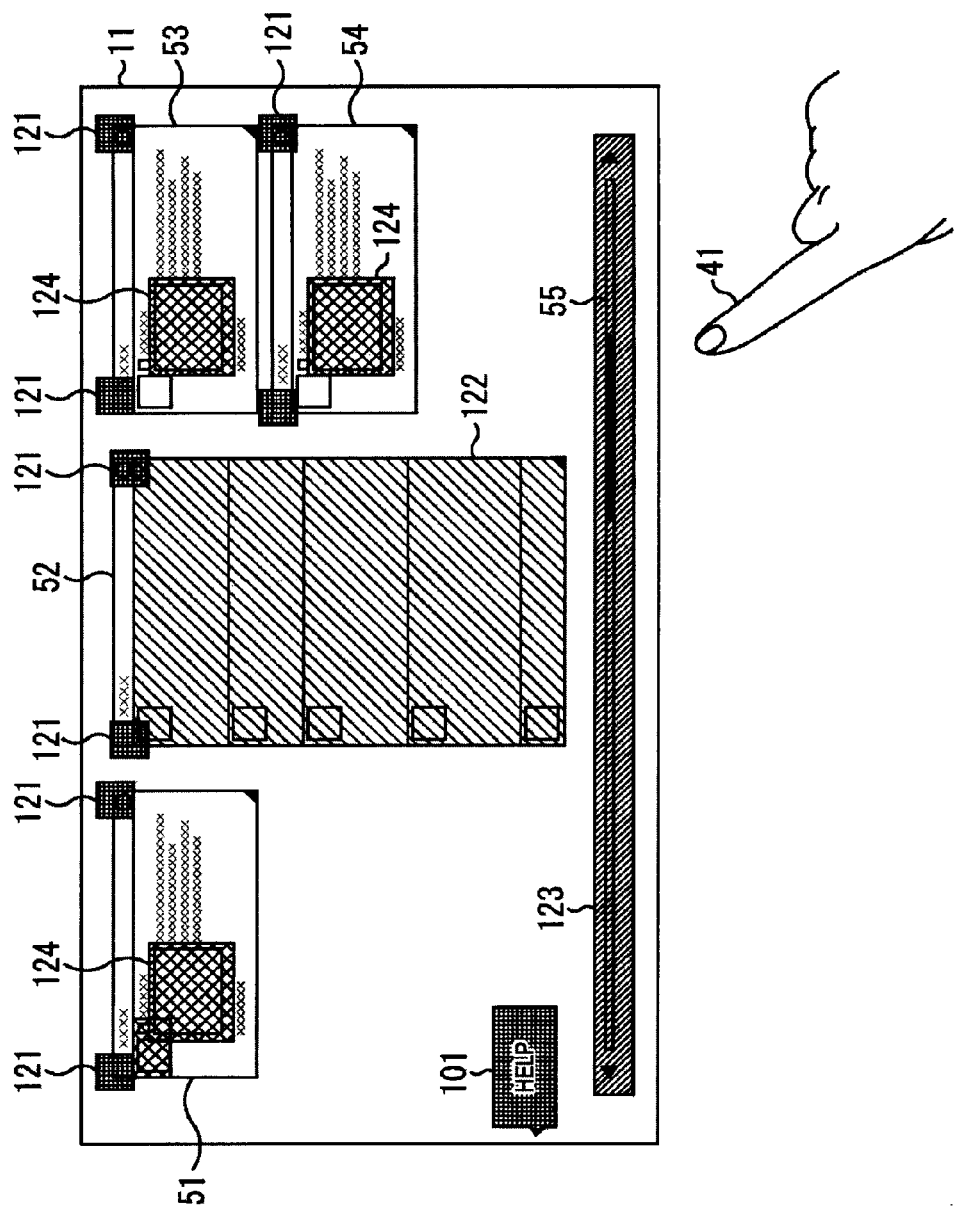
FIG. 12 is a diagram illustrating a display example when the enterable area display process is executed.

In step S35, the recognition result correction unit 32 displays areas 121 to 124 where the gesture is enterable. That is, the correction candidate generation unit 35 detects an area where the gesture is enterable at a predetermined time for each screen. In the example of FIG. 12, the areas 121 to 124 where the gesture is enterable are detected. On the basis of a detection result, the areas 121 to 124 where the gesture is enterable are displayed. The areas 121 to 124 where the gesture is enterable are expressed on an original display screen, for example, as if filters with different colors overlap. In other words, the areas 121 to 124 where the gesture is enterable are arranged so that the original display screen (for example, text, graphics, and the like) is visible, and the enterable areas are visible to the user.

For example, the area 121 where the gesture is enterable is an area where a tap is enterable in an illustrated range. The area 122 where the gesture is enterable is an area where a flick of a vertical direction (hereinafter referred to as a vertical flick) is enterable in the illustrated range. The area 123 where the gesture is enterable is an area where a flick of a horizontal direction (hereinafter referred to as a horizontal flick) is enterable in the illustrated range. The area 124 where the gesture is enterable is an area where a long press is enterable by the finger 41 of the user in continuous contact with the touch panel 25 for a predetermined time in the illustrated range. The user can know a type and position of an enterable gesture from a color and position of an area.

Figure 13:
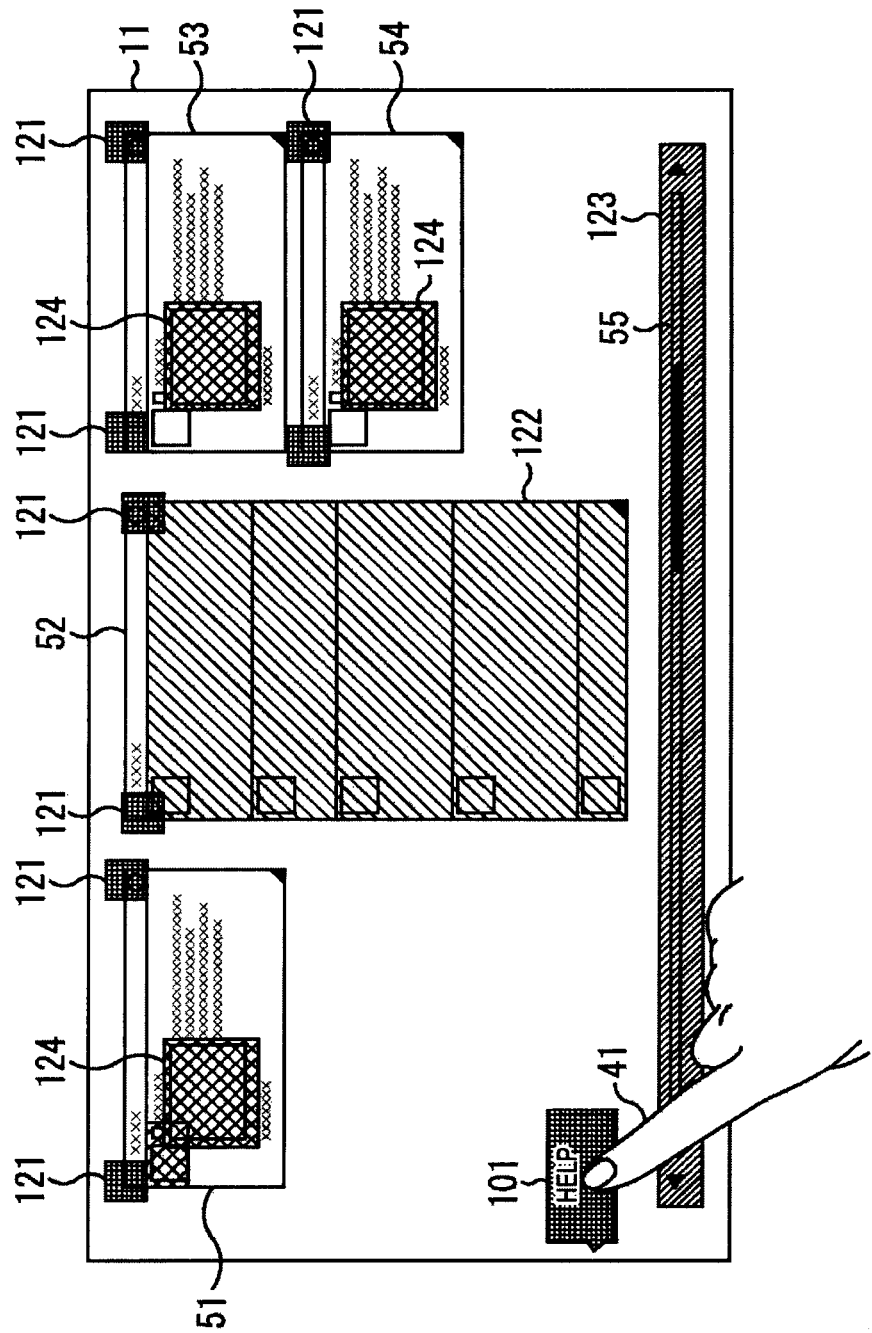
FIG. 13 is a diagram illustrating a display example when the enterable area display process is executed.

Next, in step S36, the recognition result correction unit 32 determines whether a help icon 101 has been tapped. That is, if the help icon 101 has been tapped with the finger 41 as illustrated in FIG. 13, YES is determined in step S36 and the process proceeds to step S37.

Figure 14:
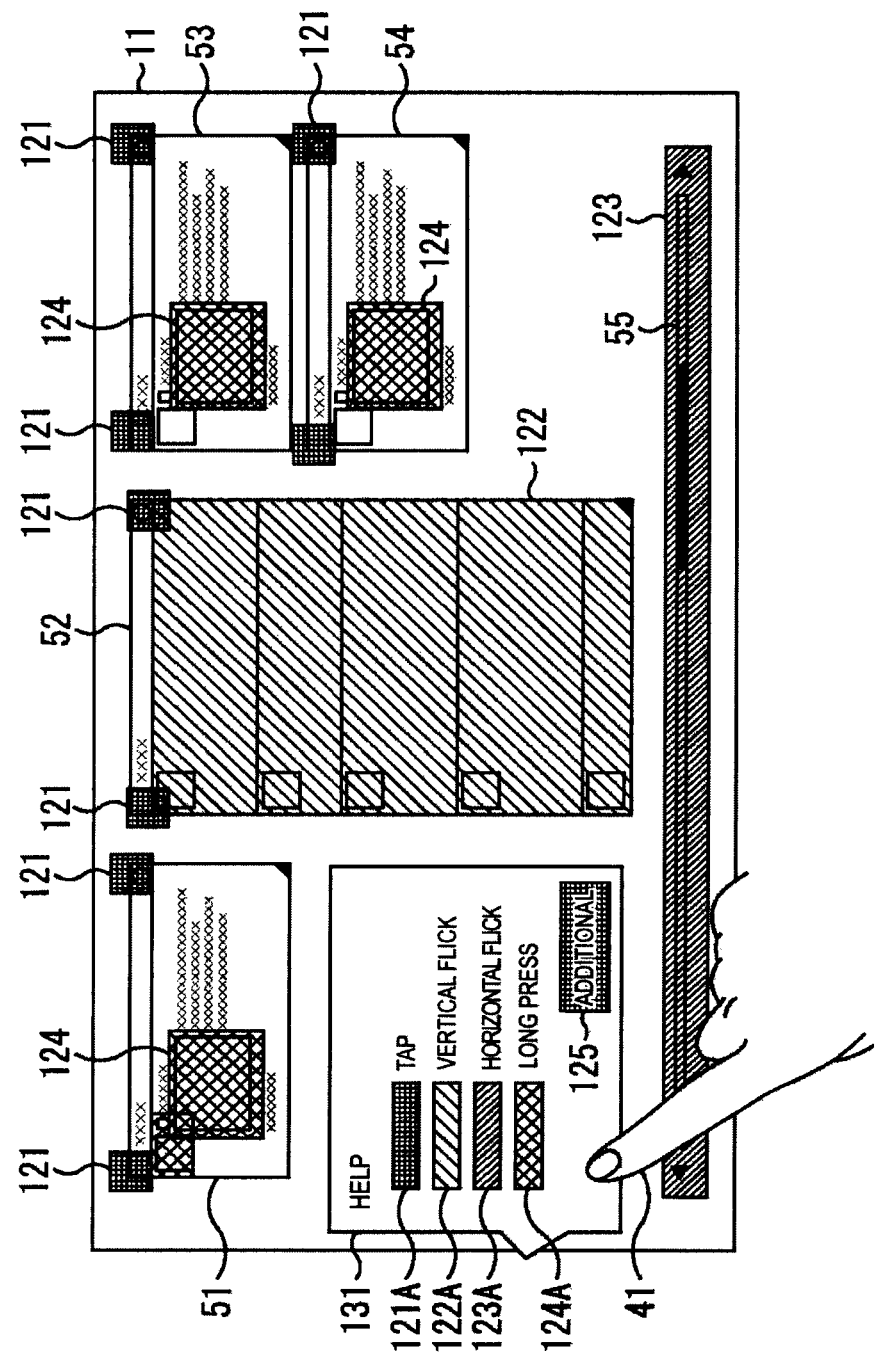
FIG. 14 is a diagram illustrating a display example when the enterable area display process is executed.

In step S37, the recognition result correction unit 32 displays a legend display screen 131. That is, the correction candidate generation unit 35 generates an image to be displayed when a predetermined area has been operated. In correspondence with the help icon 101, the legend display screen 131 illustrated in FIG. 14 is generated. The recognition result correction unit 32 displays the legend display screen 131 on the display unit 11.

As illustrated in FIG. 14, the legend display screen 131 is an enterable gesture display screen corresponding to an area indicating the areas 121 and 124 where the gesture is enterable. As described above, for example, because the area 121 where the gesture is enterable is an area where the tap is enterable, a color 121A of the area 121 where the gesture is enterable is illustrated in the legend display screen 131, and the term "tap" is displayed in correspondence therewith. Likewise, on the legend display screen 131, colors 122A to 124A of the areas 122 to 124 where the gesture is enterable are illustrated, and the terms "vertical flick," "horizontal flick," and "long press" are displayed in correspondence therewith.

Thereby, the user can understand which gesture is enterable in each of the areas 121 and 124 by viewing the legend display screen 131.

In addition, an additional icon 125 to be operated when supplementary information is displayed is further displayed on the legend display screen 131. The additional icon 125 is also a tap target icon and therefore is displayed in the same color 121A as that of the area 121 where the gesture is enterable.

In step S38, the recognition result correction unit 32 determines whether the additional icon 125 has been tapped. That is, if the additional icon 125 has been tapped with the finger 41 as illustrated in FIG. 15, YES is determined in step S38 and the process proceeds to step S39.

In step S39, the recognition result correction unit 32 displays an additional legend display screen 141. That is, as described above, the correction candidate generation unit 35 generates the additional legend display screen 141 as a display screen when the additional icon 125 has been tapped. The recognition result correction unit 32 displays the generated additional legend display screen 141 on the display unit 11. Then, the process returns to step S31.

Figure 15:
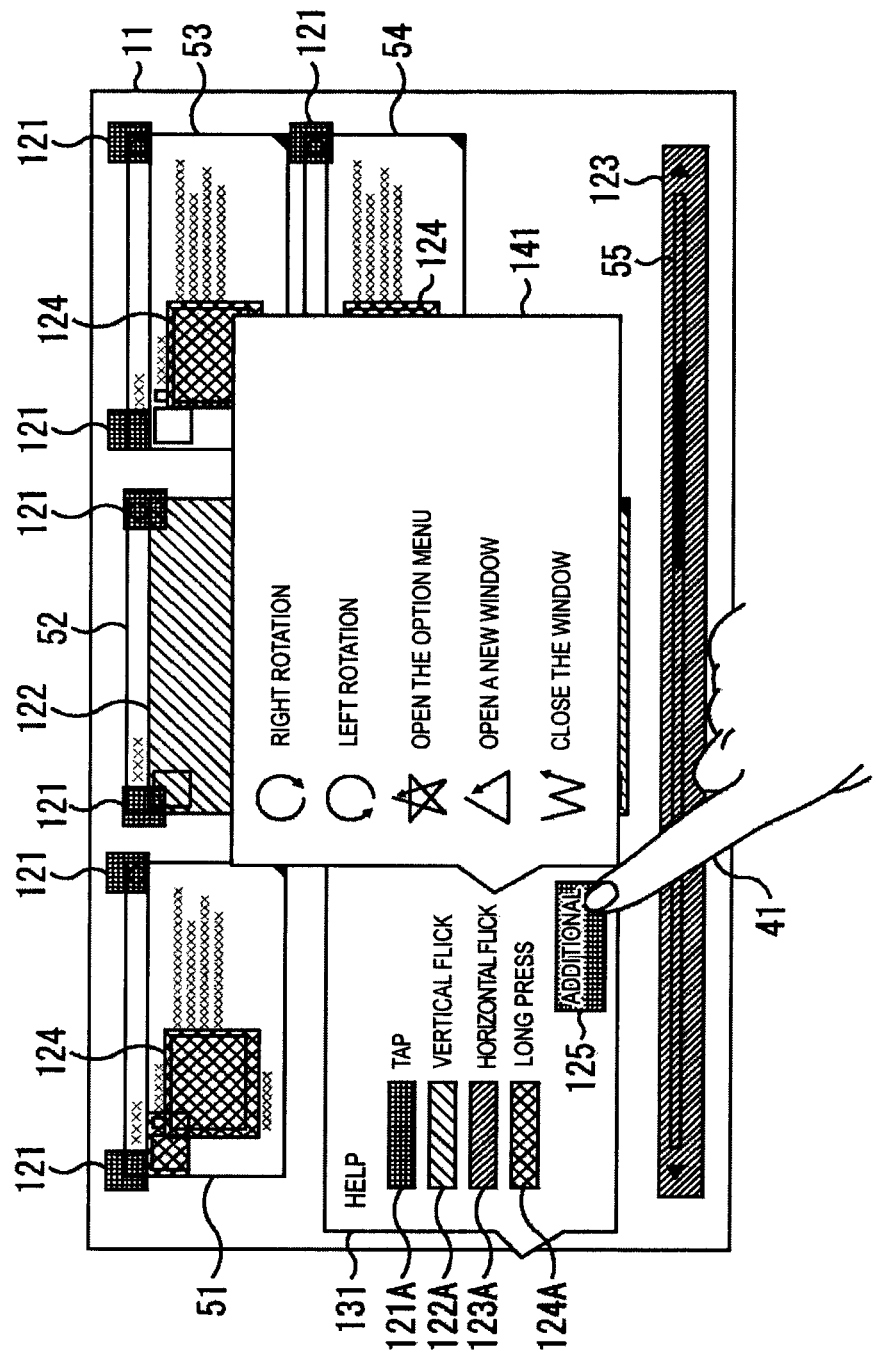
FIG. 15 is a diagram illustrating a display example when the enterable area display process is executed.

As illustrated in FIG. 15, the additional legend display screen 141 is a screen on which gestures recognizable on a current display screen are displayed. Specifically, a gesture of drawing a circle by the finger 41 in the clockwise direction (hereinafter referred to as a gesture (right rotation)) and the term "right rotation" are displayed on the additional legend display screen 141 as a process associated with the gesture (right rotation). The "right rotation" is a process of rotating a graphic or the like in a rightward direction. In addition, for example, a gesture of drawing a circle by the finger 41 in the counterclockwise direction (hereinafter referred to as a gesture (left rotation)) and the term "left rotation" are displayed as a process associated with the gesture (left rotation). The "left rotation" is, for example, a process of rotating a graphic or the like in a leftward direction. In addition, the gesture (star), the gesture (triangle), and the gesture (W) described with reference to FIG. 10 are displayed on the additional legend display screen 141 in association with the terms "Open the option menu," "Open a new window," and "Close the window."

The user can know more enterable gestures as supplementary information by referring to the additional legend display screen 141.

On the other hand, if NO is determined in step S36, that is, if the user does not tap the help icon 101, the user does not need the legend display screen 131. Consequently, the process returns to step S31. Likewise, if NO is determined in step S38, that is, if the user does not tap the additional icon 125, the process returns to step S31 because the user does not need the additional legend display screen 141.

The case where NO is determined in step S32 has been described above. On the other hand, if YES is determined in step S32, that is, if the detected gesture is recognizable, the process proceeds to step S40. That is, if YES is determined in step S32, the process of steps S33 to S39 is not executed because the areas 121 to 124 where the gesture is enterable are unnecessary.

In step S40, the gesture recognition unit 31 executes a process associated with the gesture. That is, if N unrecognizable gestures have continuously been detected (the process of step S34), the areas 121 to 124 where the gesture is enterable are displayed (the process of step S35) or the legend display screen 131 or the additional legend display screen 141 is displayed (the process of step S37 or S39). If the user can input the recognizable gesture by referring to these displays (the process of steps S31 and S32), the process proceeds to step S40. The gesture recognition unit 31 can execute the process associated with the gesture.

Thereby, an enterable area display process is executed, so that the user can view an area where a gesture is enterable on the screen in association with the enterable gesture. Thereby, the user can correct the gesture performed by the user and execute an intended process.

In addition, the user can easily correct the input gesture because an enterable area corresponding to the gesture input is displayed on the legend display screen 131 even when the gesture input or the enterable area differs according to an application.

The above-described series of processes can be executed by hardware or software. When the series of processes is executed by software, a program constituting the software is installed in a computer. Here, the computer includes a computer embedded in the information processing terminal 1 as dedicated hardware or a general-purpose personal computer, for example, which can execute various functions by installing various programs.

The program executed by the computer (the controller 21) can be provided, for example, by configuring the storage unit 26 as a removable medium such as a package medium and recording the program thereon. The program can also be provided via a wired or wireless transmission medium such as a LAN, the Internet, or digital satellite broadcasting.

The program executed by the computer may be a program in which the processes are performed in the chronological order described in this specification or a program in which the processes are performed in parallel or at appropriate timings such as upon a call.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing terminal comprising:
  an input unit for receiving an input of a gesture;
  a recognition unit for recognizing the gesture input to the input unit; and
  a display unit for displaying gestures enterable on a screen to which the gesture has been input as correction candidates if the input gesture is unrecognizable.

(2) The information processing terminal according to (1), further comprising:
  a trajectory display control unit for displaying a trajectory of the input gesture and displaying the trajectory as an icon.

(3) The information processing terminal according to (1) or (2), wherein the correction candidates are displayed in order of decreasing resemblance of the gestures to the unrecognizable gesture.
(4) The information processing terminal according to any one of (1) to (3), further comprising:
a storage unit for storing correction information in which the trajectory is associated with the correction candidate selected by a user if the input gesture is unrecognizable.
(5) An information processing method comprising:
receiving an input of a gesture;
recognizing the input gesture; and
displaying gestures enterable on a screen to which the gesture has been input as correction candidates if the input gesture is unrecognizable.
(6) A program for causing a computer to execute:
receiving an input of a gesture;
recognizing the input gesture; and
displaying gestures enterable on a screen to which the gesture has been input as correction candidates if the input gesture is unrecognizable.
(7) A computer-readable recording medium having recorded thereon a program, the program being adapted to cause a computer to execute:
receiving an input of a gesture;
recognizing the input gesture; and
displaying gestures enterable on a screen to which the gesture has been input as correction candidates if the input gesture is unrecognizable.

The present disclosure contains subject matter related to that disclosed in Japanese Priority Patent Application JP 2011-127334 filed in the Japan Patent Office on Jun. 17, 2011, the entire content of which is hereby incorporated by reference.

What is claimed is:

1. An information processing terminal comprising:
an input unit for receiving an input of a gesture;
a recognition unit for recognizing the gesture input to the input unit;
a trajectory display control unit for displaying a trajectory of the input gesture and displaying the trajectory as an icon; and
a display unit for displaying, upon a selection of the icon, candidate gestures enterable on a screen to which the gesture has been input as correction candidates if the input gesture is unrecognizable.

2. The information processing terminal according to claim 1, wherein the correction candidates are displayed in order of decreasing resemblance of the gestures to the unrecognizable gesture.

3. The information processing terminal according to claim 2, further comprising:
a storage unit for storing correction information in which the trajectory is associated with the correction candidate selected by a user if the input gesture is unrecognizable.

4. An information processing method comprising:
receiving an input of a gesture;
recognizing the input gesture;
displaying a trajectory of the input gesture as an icon; and
displaying, upon a selection of the icon, candidate gestures enterable on a screen to which the gesture has been input as correction candidates if the input gesture is unrecognizable.

5. The information processing method according to claim 4, wherein the correction candidates are displayed in order of decreasing resemblance of the gestures to the unrecognizable gesture.

6. The information processing method according to claim 5, further comprising:
storing, in a storage unit, correction information in which the trajectory is associated with the correction candidate selected by a user if the input gesture is unrecognizable.

7. A non-transitory computer-readable recording medium having recorded thereon a program, which when executed by a processor the program being adapted to cause a computer to execute a method, the method comprising:
receiving an input of a gesture;
recognizing the input gesture;
displaying a trajectory of the input gesture as an icon; and
displaying, upon a selection of the icon, candidate gestures enterable on a screen to which the gesture has been input as correction candidates if the input gesture is unrecognizable.

8. The non-transitory computer-readable recording medium according to claim 7, wherein the correction candidates are displayed in order of decreasing resemblance of the gestures to the unrecognizable gesture.

9. The non-transitory computer-readable recording medium according to claim 8, wherein the executed method further comprises:
storing, in a storage unit, correction information in which the trajectory is associated with the correction candidate selected by a user if the input gesture is unrecognizable.

* * * * *